(12) United States Patent
Tomonaga et al.

(10) Patent No.: US 9,815,350 B2
(45) Date of Patent: Nov. 14, 2017

(54) VEHICLE AIR-CONDITIONING APPARATUS

(71) Applicant: MITSUBISHI ELECTRIC CORPORATION, Chiyoda-ku, Tokyo (JP)

(72) Inventors: Yasushi Tomonaga, Tokyo (JP); Hidetaka Adachi, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 45 days.

(21) Appl. No.: 14/762,676

(22) PCT Filed: Nov. 29, 2013

(86) PCT No.: PCT/JP2013/082114
§ 371 (c)(1),
(2) Date: Jul. 22, 2015

(87) PCT Pub. No.: WO2014/147891
PCT Pub. Date: Sep. 25, 2014

(65) Prior Publication Data
US 2015/0367710 A1  Dec. 24, 2015

(30) Foreign Application Priority Data

Mar. 19, 2013  (JP) ................................ 2013-056613

(51) Int. Cl.
*B60H 1/32* (2006.01)
*B60H 1/00* (2006.01)
(Continued)

(52) U.S. Cl.
CPC ....... *B60H 1/3204* (2013.01); *B60H 1/00371* (2013.01); *B60H 1/00521* (2013.01); *B61D 17/12* (2013.01); *B61D 27/0072* (2013.01)

(58) Field of Classification Search
CPC ............ B60H 1/00371; B60H 1/00521; B60H 1/3204; B60H 1/32; B60H 1/00421;
(Continued)

(56) References Cited

U.S. PATENT DOCUMENTS 5,005,372 A * 4/1991 King .................. B60H 1/00371
62/244
6,189,944 B1 * 2/2001 Piche .................... B60P 3/0257
296/22

(Continued)

FOREIGN PATENT DOCUMENTS

JP    58-128111 U    8/1983
JP    64-056269 A    3/1989
(Continued)

OTHER PUBLICATIONS

International Search Report (PCT/ISA/210) dated Feb. 10, 2014, by the Japanese Patent Office as the International Searching Authority for International Application No. PCT/JP2013/082114.

(Continued)

*Primary Examiner* — Mohammad M Ali
(74) *Attorney, Agent, or Firm* — Buchanan Ingersoll & Rooney PC

(57) ABSTRACT

A vehicle air-conditioning apparatus is installed at an upper portion of a vehicle and includes an apparatus main body which includes an outdoor unit chamber and an indoor unit chamber, a compressor, a first heat exchanger, an outdoor blower, a second heat exchanger, an indoor blower, and an electrical component box which houses an inverter that controls the compressor. A return port for taking in in-vehicle air is provided at a lower portion of the indoor unit chamber, and the electrical component box is installed in a (Continued)

space inside the indoor unit chamber so as to be close to the ceiling of the indoor unit chamber, the space defined above the return port.

9 Claims, 10 Drawing Sheets

(51) Int. Cl.
*B61D 17/12* (2006.01)
*B61D 27/00* (2006.01)

(58) Field of Classification Search
CPC ............ B60H 1/00457; B60H 1/00642; B60H 1/00528; B60H 2001/00614; B61D 27/0072; B61D 17/12
USPC .................................................. 62/244, 498
See application file for complete search history.

(56) References Cited

U.S. PATENT DOCUMENTS

| | | | | |
|---|---|---|---|---|
| 6,295,826 | B1* | 10/2001 | Lee .................... | B60H 1/00371 62/244 |
| 6,339,934 | B1* | 1/2002 | Yoon .................. | B60H 1/00364 62/244 |
| 6,751,975 | B1* | 6/2004 | Reimann ............ | B60H 1/00371 62/244 |
| 6,915,651 | B2* | 7/2005 | Hille .................. | B60H 1/00371 62/244 |
| 8,535,127 | B2* | 9/2013 | Malott ................ | F24F 13/06 454/292 |
| 2004/0221595 | A1* | 11/2004 | Hille .................. | B60H 1/00371 62/244 |
| 2004/0221606 | A1* | 11/2004 | Reimann ............ | B60H 1/00371 62/280 |
| 2008/0053129 | A1* | 3/2008 | Follette .............. | B60H 1/00371 62/244 |
| 2011/0061414 | A1* | 3/2011 | McAllister, II .... | B60H 1/00371 62/244 |
| 2012/0090342 | A1* | 4/2012 | Ikemiya ............. | B60P 3/20 62/239 |
| 2012/0102974 | A1* | 5/2012 | Kawazoe ........... | B60H 1/00035 62/3.61 |

FOREIGN PATENT DOCUMENTS

| | | |
|---|---|---|
| JP | 01-212663 A | 8/1989 |
| JP | 03-271058 A | 12/1991 |
| JP | 03-295756 A | 12/1991 |
| JP | 04-18068 U | 2/1992 |
| JP | 04-078654 A | 3/1992 |
| JP | 05-008635 A | 1/1993 |
| JP | 2000-142393 A | 5/2000 |

OTHER PUBLICATIONS

Written Opinion (PCT/ISA/237) dated Feb. 10, 2014, by the Japanese Patent Office as the International Searching Authority for International Application No. PCT/JP2013/082114.
Office Action (Reasons) dated Sep. 8, 2015, by the Japanese Patent Office in corresponding Japanese Patent Application No. 2015-506548, and an English Translation of the Office Action. (7 pages).
Office Action dated Jul. 6, 2016, by the Chinese Patent Office in corresponding Chinese Patent Application No. 2013800748961 and English translation of the Office Action. (16 pages).
Supplementary European Search Report dated Oct. 28, 2016, in corresponding EP Patent Application No. 13878777.5.
Second Office Action dated Mar. 2, 2017 in corresponding Chinese Application No. 201380074896.1, and an English language translation thereof.

\* cited by examiner

VEHICLE AIR-CONDITIONING APPARATUS

TECHNICAL FIELD

The present invention relates to a vehicle air-conditioning apparatus used in a vehicle.

BACKGROUND ART

Examples of a vehicle air-conditioning apparatus used in a vehicle, such as a train, include a ceiling-mounted one which is embedded in a ceiling of a vehicle and a rooftop one which is placed on a roof of a vehicle. Such a vehicle air-conditioning apparatus includes a compressor, a condenser, an outdoor blower, an evaporator, an indoor blower, an electrical component box, and the like. A return port for taking in in-vehicle air is provided at a lower portion of the vehicle air-conditioning apparatus. The electrical component box which houses, for example, an inverter, an air-conditioning controller, and a contactor is arranged midway along a passageway for in-vehicle air. With this configuration, the electrical component box is cooled by in-vehicle air taken in through the return port.

Patent Literature 1 discloses a vehicle air-conditioning apparatus which is composed of a compressor, an outdoor heat exchanger, an indoor heat exchanger, an outdoor fan, an indoor fan, and an electrical component box, wherein an outdoor unit chamber housing the compressor, the outdoor heat exchanger, and the outdoor fan and an indoor unit chamber housing the indoor heat exchanger, the indoor fan, and the electrical component box are coupled with each other such that the compressor and an inverter are located back-to-back.

CITATION LIST

Patent Literature

Patent Literature 1: Japanese Unexamined Patent Application Publication No. 1-212663 (claim 2, page 3, and FIGS. 1 and 2)

SUMMARY OF INVENTION

Technical Problem

In the vehicle air-conditioning apparatus disclosed in Patent Literature 1, a return grille is installed at a return port, and the inverter is arranged in close proximity to the return port. The inverter requires periodic inspections and needs to be easily removable from the vehicle air-conditioning apparatus for easy inspection. The inverter is thus arranged in proximity to the return port such that the inverter can be immediately removed from below the vehicle air-conditioning apparatus at a time of inspection.

Since the inverter is arranged in close proximity to the return port in the vehicle air-conditioning apparatus disclosed in Patent Literature 1, air ventilation is blocked by the inverter itself, and a decreased area of air ventilation at the return port results. This increases ventilation resistance. In order to reduce the ventilation resistance, the return port needs to be enlarged by an amount, by which the area of the return port is decreased by the inverter. The enlargement of the return port, however, causes the problem of an increase in size of the vehicle air-conditioning apparatus. Enhancing performance (a static pressure) of the indoor blower to increase an amount of ventilation by an amount corresponding to an increase in ventilation resistance involves upsizing of the indoor blower, which increases noise from the indoor blower. The upsizing of the indoor blower leads to upsizing of the vehicle air-conditioning apparatus itself. This increases a mass of the vehicle air-conditioning apparatus.

The present invention has been made against a background of the above-described problems and has as an object to provide a vehicle air-conditioning apparatus which can be reduced in size while securing a sufficient amount of ventilation.

Solution to Problem

A vehicle air-conditioning apparatus according to the present invention includes an apparatus main body installed at an upper portion of a vehicle, the apparatus main body including an outdoor unit chamber and an indoor unit chamber; a compressor installed in the outdoor unit chamber; a first heat exchanger installed in the outdoor unit chamber to exchange heat between refrigerant and out-of-vehicle air; an outdoor blower installed in the outdoor unit chamber to blow the out-of-vehicle air after heat exchange in the first heat exchanger to outside the vehicle; a second heat exchanger installed in the indoor unit chamber to exchange heat between the refrigerant and in-vehicle air; an indoor blower installed in the indoor unit chamber to blow the in-vehicle air after heat exchange in the second heat exchanger into the vehicle; an electrical component box installed in the indoor unit chamber and housing an inverter that controls the compressor; and a return port to take in the in-vehicle air, provided at a lower portion of the indoor unit chamber. The electrical component box is positioned in a space inside the indoor unit chamber so as to be close to a ceiling of the indoor unit chamber, the space defined above the return port.

Advantageous Effects of Invention

According to the present invention, the electrical component box is installed in a space inside the indoor unit chamber so as to be close to the ceiling of the indoor unit chamber, the space defined above the return port. This allows securement of a sufficient area of the return port without a need to increase a size of the apparatus main body.

DESCRIPTION OF EMBODIMENTS

Figure 1:
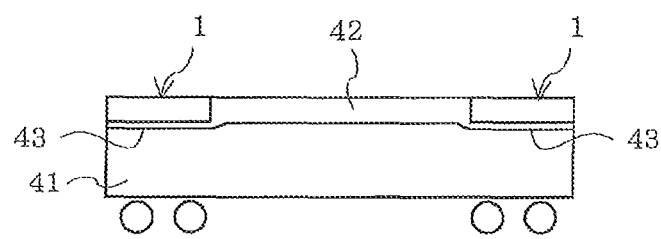
FIG. 1 is a side view showing a vehicle 41 according to Embodiment 1.

Embodiments of a vehicle air-conditioning apparatus according to the present invention will be described below with reference to the drawings. Note that the embodiments described below are not intended to limit the present invention. In the drawings including FIG. 1, relationships between sizes of constituent members may be different from actual ones. Although directional terms (e.g., "up," "down," "right," "left," "front," and "back") are appropriately used in the description below for ease of comprehension, the terms are only illustrative and are not intended to limit the present invention.

Embodiment 1

Figure 2:
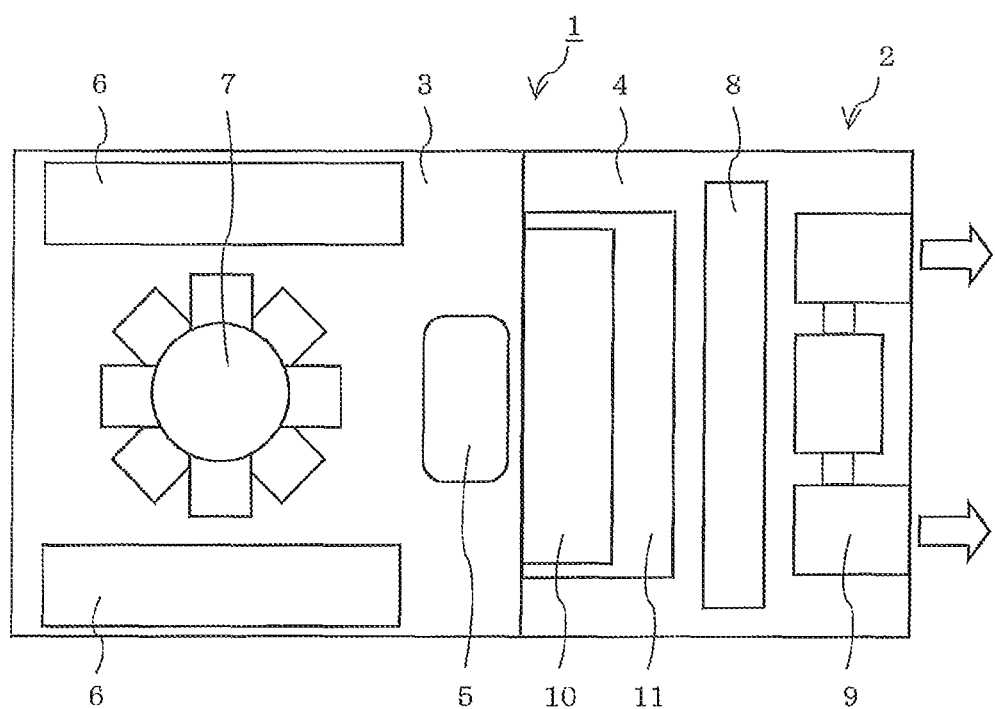
FIG. 2 is a top view showing a vehicle air-conditioning apparatus 1 according to Embodiment 1.
Figure 3:
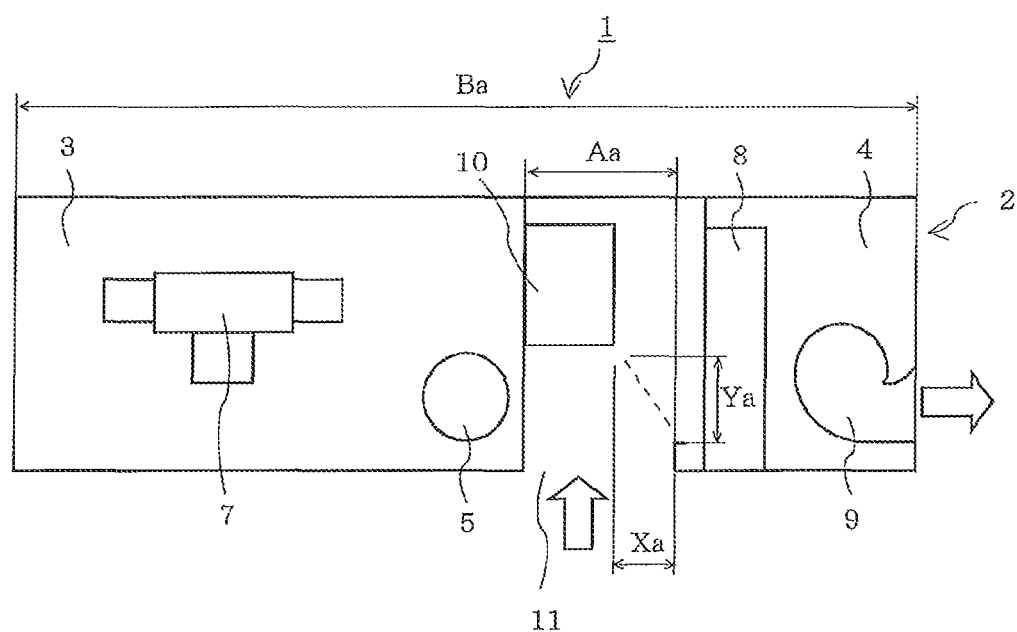
FIG. 3 is a side view showing the vehicle air-conditioning apparatus 1 according to Embodiment 1.
Figure 4:
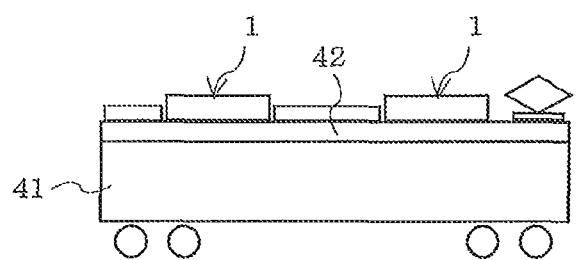
FIG. 4 is a side view showing the vehicle 41 according to Embodiment 1.

FIG. 1 is a side view showing a vehicle 41 according to Embodiment 1. FIG. 2 is a top view showing a vehicle air-conditioning apparatus 1 according to Embodiment 1. FIG. 3 is a side view showing the vehicle air-conditioning apparatus 1 according to Embodiment 1. The vehicle air-conditioning apparatus 1 will be described with reference to FIGS. 1, 2, and 3. As shown in FIG. 1, two vehicle air-conditioning apparatuses 1 are embedded in two end portions in a vehicle longitudinal direction (ceilings 43 (under the vehicle air-conditioning apparatuses)) of a ceiling 42 of the vehicle 41. Note that the vehicle air-conditioning apparatus 1 according to the present invention is not limited to a ceiling-mounted one and may be a rooftop one which is placed on a roof of the vehicle 41, as shown in FIG. 4.

As shown in FIG. 2, the vehicle air-conditioning apparatus 1 includes an apparatus main body 2 which constitutes an outer contour of the apparatus. The apparatus main body 2 is installed at an upper portion of the vehicle 41. The apparatus main body 2 includes an outdoor unit chamber 3 and an indoor unit chamber 4. A compressor 5, a condenser 6 (a first heat exchanger), and an outdoor blower 7 are installed in the outdoor unit chamber 3 of the chambers. The compressor 5 is designed to compress gas refrigerant which flows through the apparatus main body 2. Compression of the gas refrigerant raises temperature of the gas refrigerant. The compressor 5 is installed, for example, in proximity to a boundary between the outdoor unit chamber 3 and the indoor unit chamber 4 and is controlled by an inverter (to be described later). The condenser 6 is designed to exchange heat between the compressed gas refrigerant and out-of-vehicle air. Through the heat exchange, the gas refrigerant condenses into liquid refrigerant. Two condensers 6 are installed, for example, at two end portions in a vehicle width direction of the outdoor unit chamber 3. The outdoor blower 7 blows the out-of-vehicle air heated through the heat exchange with the gas refrigerant to outside the vehicle. The outdoor blower 7 is installed, for example, between the two condensers 6, and an air outlet of the outdoor blower 7 is made to face toward a ceiling of the outdoor unit chamber 3.

An evaporator 8 (a second heat exchanger), an indoor blower 9, and an electrical component box 10 which houses an inverter and the like are installed in the indoor unit chamber 4. The evaporator 8 is designed to exchange heat between the liquid refrigerant compressed in the condensers 6 and in-vehicle air. Through the heat exchange, the liquid refrigerant evaporates into gas refrigerant. The evaporator 8 extends, for example, in the vehicle width direction and in a vehicle vertical direction and is installed at a midpoint in the vehicle longitudinal direction of the indoor unit chamber 4. The gas refrigerant flows into the compressor 5 again. As described above, refrigerant circulates through a channel, which runs through the compressor 5, the condensers 6, and the evaporator 8, inside the apparatus main body 2. The indoor blower 9 blows in-vehicle air cooled through heat exchange with liquid refrigerant into the vehicle. The indoor blower 9 is installed, for example, at an end portion on a side opposite to the outdoor unit chamber 3 of the indoor unit chamber 4, and an air outlet of the indoor blower 9 is made to face in the vehicle longitudinal direction. The electrical component box 10 is installed, for example, in proximity to the boundary between the outdoor unit chamber 3 and the indoor unit chamber 4. With this configuration, the electrical component box 10 and the compressor 5 are located in proximity to each other and across a partition between the two chambers from each other. The inverter housed in the electrical component box 10 controls the compressor 5. Note that an air conditioning control device, a contactor, or the like may be housed in the electrical component box 10, in addition to the inverter.

An installation position of the electrical component box 10 will be described in detail. As shown in FIG. 3, a return port 11 for taking in in-vehicle air is provided at a lower portion of the indoor unit chamber 4 in proximity to the boundary between the indoor unit chamber 4 and the outdoor unit chamber 3. In-vehicle air taken in through the return port 11 passes through the evaporator 8 installed in the indoor unit chamber 4 and is blown into the vehicle by the indoor blower 9. The provision of the return port 11 at the lower portion of the indoor unit chamber 4 causes in-vehicle air to circulate. The electrical component box 10 is arranged so as to be close to the ceiling of the indoor unit chamber 4 in a space inside the indoor unit chamber 4, the space defined above the return port 11. As described above, in the present embodiment, the electrical component box 10 is installed at a position away from the return port 11. The electrical component box 10 is cooled when in-vehicle air taken in through the return port 11 comes into contact with the electrical component box 10.

Figure 5:
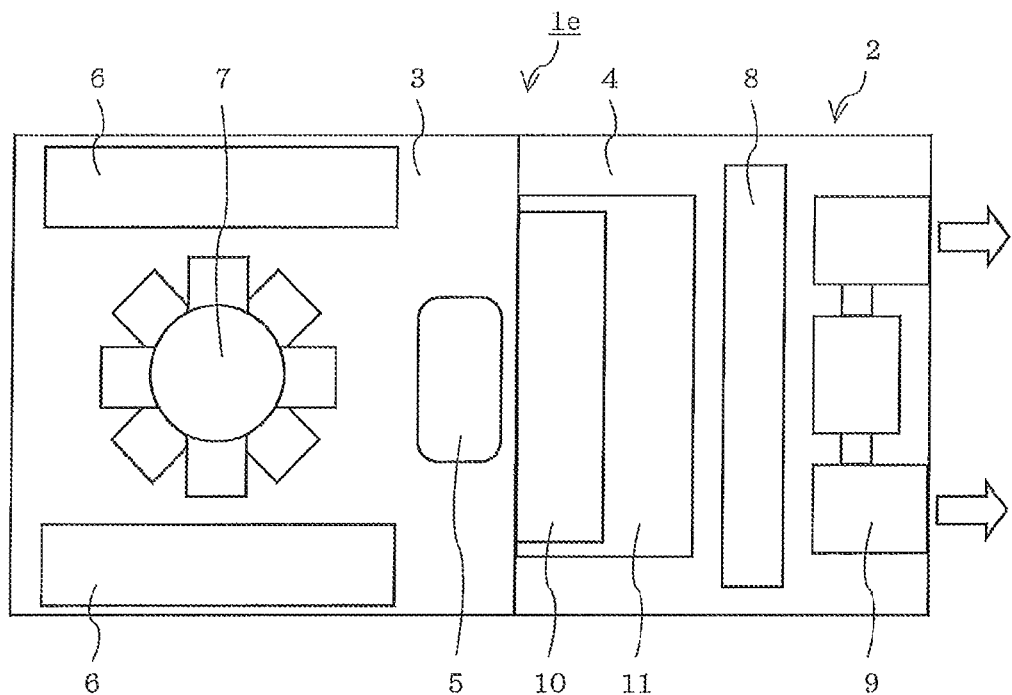
FIG. 5 is a top view showing a vehicle air-conditioning apparatus 1e with an electrical component box 10 arranged in proximity to a return port 11.
Figure 6:
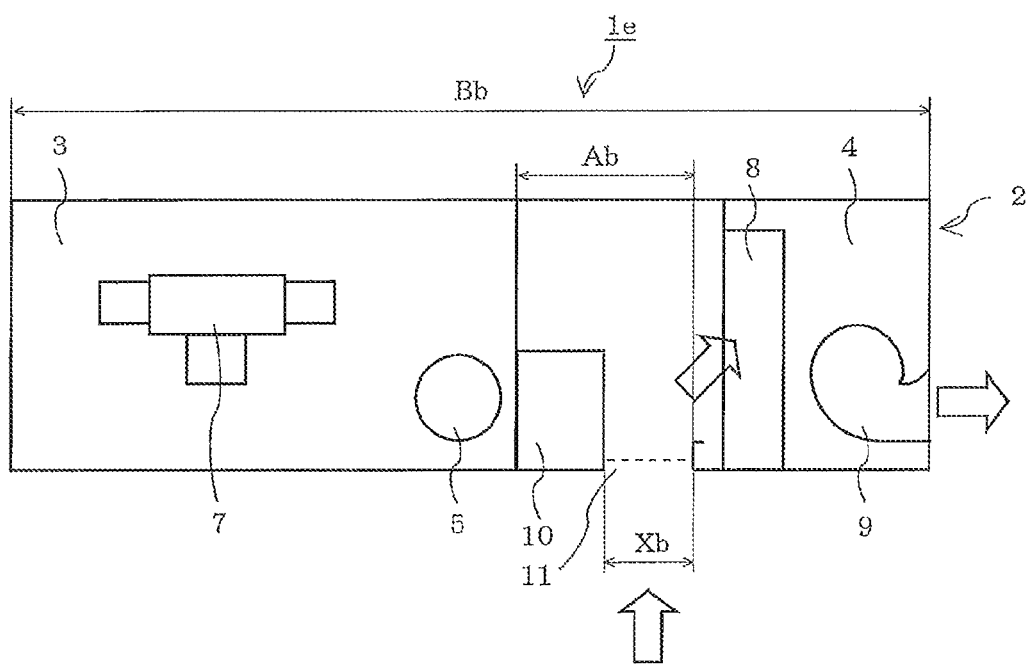
FIG. 6 is a side view showing the vehicle air-conditioning apparatus 1e with the electrical component box 10 arranged in proximity to the return port 11.

Action of the vehicle air-conditioning apparatus 1 according to Embodiment 1 will be described. FIG. 5 is a top view showing a vehicle air-conditioning apparatus 1e with the electrical component box 10 arranged in proximity to the return port 11. FIG. 6 is a side view showing the vehicle air-conditioning apparatus 1e with the electrical component box 10 arranged in proximity to the return port 11. To clearly explain the action of the vehicle air-conditioning apparatus 1 according to the present embodiment, the vehicle air-conditioning apparatus 1 (FIGS. 2 and 3) according to the present embodiment will be compared with the vehicle air-conditioning apparatus 1e (FIGS. 5 and 6) with the electrical component box 10 arranged in proximity to the return port 11.

Referring to FIGS. 5 and 6, the electrical component box 10 is installed on a vehicle side of the indoor unit chamber 4 in a space inside the indoor unit chamber 4, the space defined above the return port 11. For this reason, a part of the return port 11 is blocked by the electrical component box 10. For in-vehicle air, its passageway is narrowest at a portion, clear of the electrical component box 10, of the return port 11. Let Xb be a dimension in a vehicle longitudinal direction at the portion. Note that let Ab be a dimension in the vehicle longitudinal direction at the return port 11 and Bb be a dimension in the vehicle longitudinal direction of the apparatus main body 2.

In contrast, in the present embodiment, the electrical component box 10 is installed so as to be close to the ceiling of the indoor unit chamber 4 in a space inside the indoor unit chamber 4, the space defined above the return port 11, as shown in FIGS. 2 and 3. For this reason, the return port 11 is not blocked by the electrical component box 10. Passage of in-vehicle air taken in through the return port 11 is most greatly restricted at a gap between an edge in the vehicle longitudinal direction of the return port 11 and the electrical component box 10. A diagonal dimension of the gap between the edge in the vehicle longitudinal direction of the return port 11 and the electrical component box 10 corresponds to Xb in FIG. 6. Let Xa be a dimension in the vehicle longitudinal direction of the gap and Ya be a dimension in the vehicle vertical direction of the gap. Note that let Aa be a dimension in the vehicle longitudinal direction at the return port 11 and Ba be a dimension in the vehicle longitudinal direction of the apparatus main body 2.

In the vehicle air-conditioning apparatus 1e in FIGS. 5 and 6, Xb needs to be large by increasing an area (Ab) of the return port 11 in order to reduce a static pressure loss of in-vehicle air taken in through the return port 11. This increases Bb, which results in an increase in entire length of the vehicle air-conditioning apparatus 1e and an increase in mass.

In contrast, in the vehicle air-conditioning apparatus 1 according to the present embodiment, the electrical component box 10 is installed in a space inside the indoor unit chamber 4 so as to be close to the ceiling of the indoor unit chamber 4, the space defined above the return port 11, and the gap between the edge in the vehicle longitudinal direction of the return port 11 and the electrical component box 10 is inclined in a side view. If the vehicle air-conditioning apparatus 1 according to the present embodiment is set so as to have a ventilation static pressure equal to a ventilation static pressure of the vehicle air-conditioning apparatus 1e in FIGS. 5 and 6, since the portion corresponding to the dimension Xb in FIG. 6 is inclined, a component (the dimension Xa) in the vehicle longitudinal direction for the portion is smaller than Xb by an amount borne by a component (the dimension Ya) in the vehicle vertical direction for the portion. As described above, since Xa<Xb holds, the dimension Aa in the vehicle longitudinal direction at the return port 11 can also be made smaller (Aa<Ab). The dimension Ba in the vehicle longitudinal direction of the apparatus main body 2 can also be made smaller (Ba<Bb). As seen from the above, the vehicle air-conditioning apparatus 1 according to the present embodiment can be reduced in size and mass while securing a sufficient amount of in-vehicle air ventilation from the return port 11.

Embodiment 2

Figure 7:
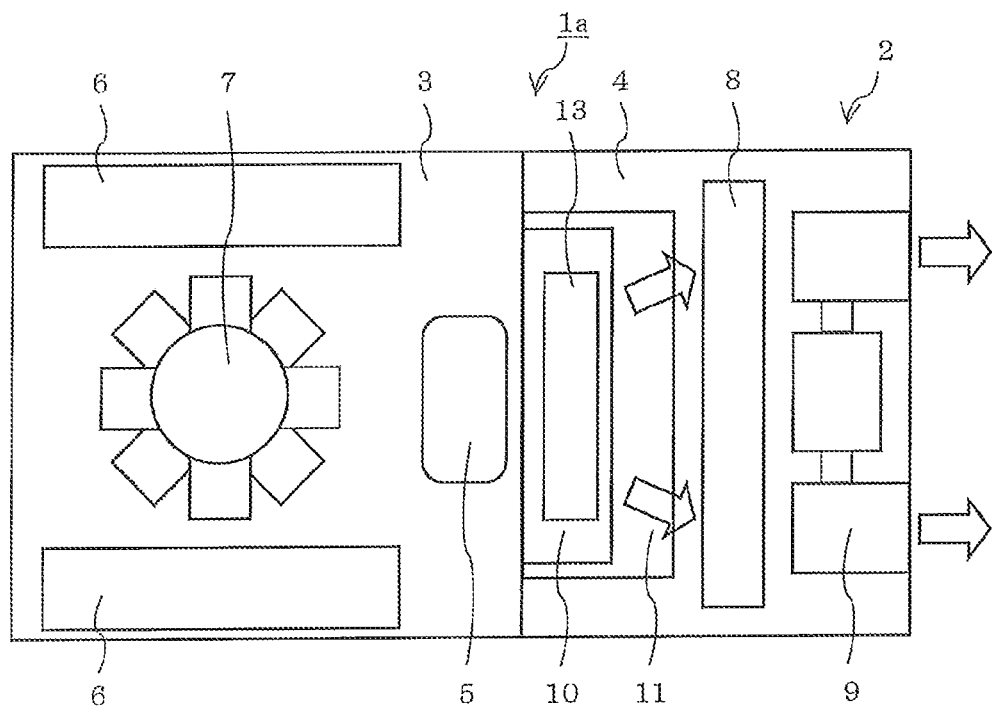
FIG. 7 is a top view showing a vehicle air-conditioning apparatus 1a according to Embodiment 2.
Figure 8:
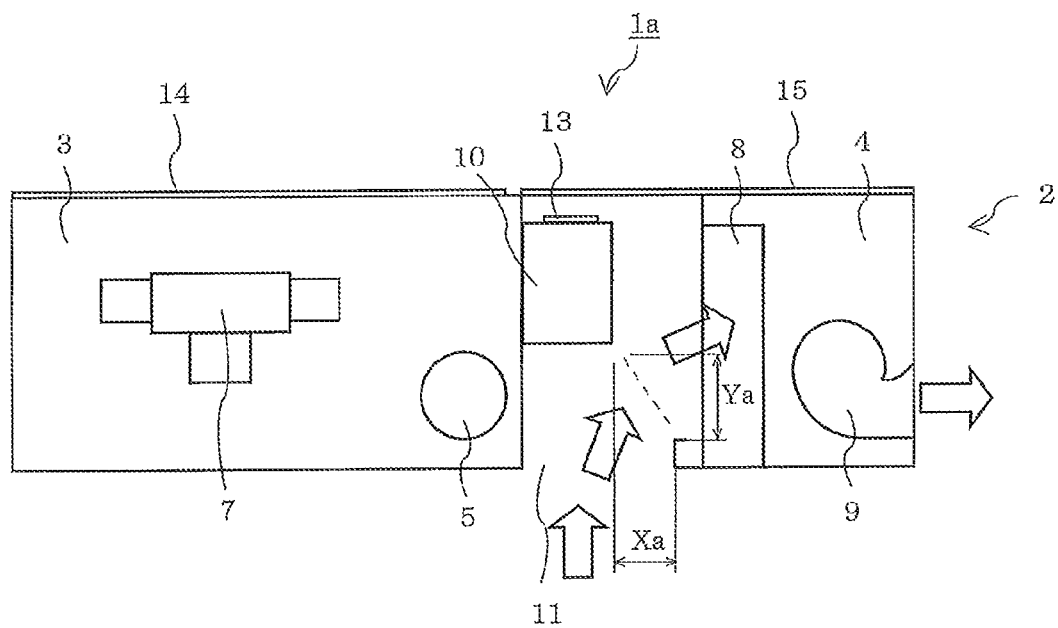
FIG. 8 is a side view showing the vehicle air-conditioning apparatus 1a according to Embodiment 2.

A vehicle air-conditioning apparatus 1a according to Embodiment 2 will be described. FIG. 7 is a top view showing the vehicle air-conditioning apparatus 1a according to Embodiment 2. FIG. 8 is a side view showing the vehicle air-conditioning apparatus 1a according to Embodiment 2. The present embodiment is different from Embodiment 1 in that an access cover 13 is provided on an upper surface of an electrical component box 10. A description of similarities of Embodiment 2 to Embodiment 1 will be omitted, and Embodiment 2 will be described with a focus on differences from Embodiment 1.

As shown in FIGS. 7 and 8, the access cover 13 is provided on the upper surface of the electrical component box 10. An inverter and the like housed in the electrical component box 10 can be inspected by opening and closing the access cover 13. The electrical component box 10 is provided so as to be close to the ceiling of an indoor unit chamber 4, and the upper surface of the electrical component box 10 is openable and closable. It is thus easy to reach an interior of the electrical component box 10 from above the vehicle air-conditioning apparatus 1a. This allows an improvement in workability of maintenance of parts housed in the electrical component box 10. As described above, the present embodiment can achieve an effect of improving the workability of maintenance of the parts in the electrical component box 10, in addition to the effect achieved in Embodiment 1. Note that an outdoor top cover 14 is provided on an upper surface of the outdoor unit chamber 3 and that a ceiling of an outdoor unit chamber 3 is opened or closed by opening or closing the outdoor top cover 14. An indoor top cover 15 is also provided on an upper surface of the indoor unit chamber 4. As in the outdoor unit chamber 3, a ceiling of the indoor unit chamber 4 is opened or closed by opening or closing the indoor top cover 15.

Embodiment 3

Figure 9:
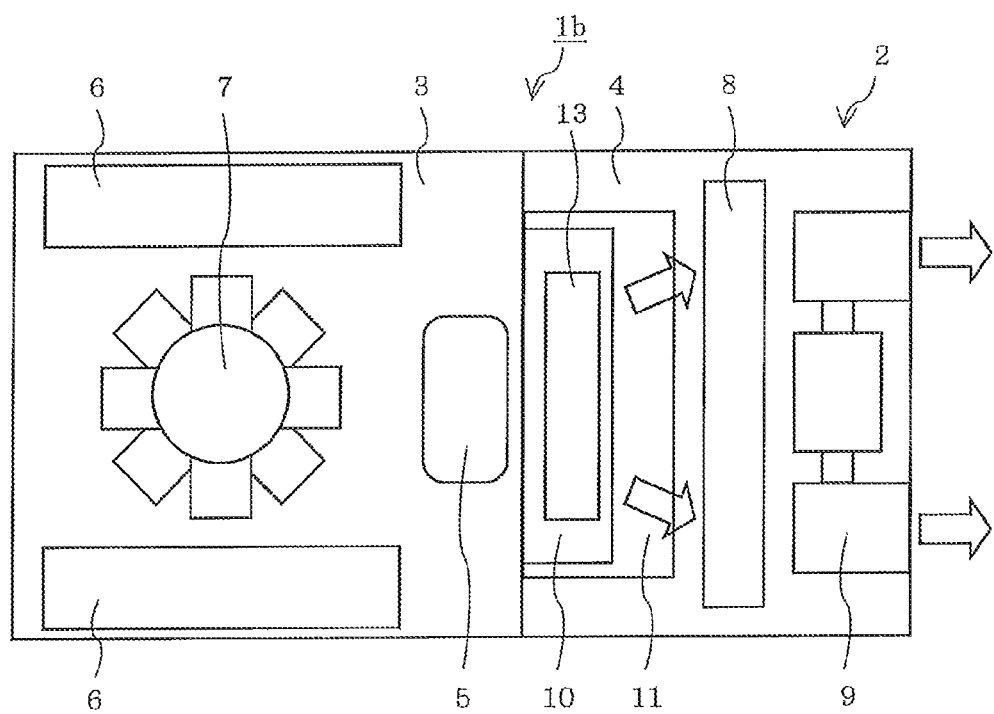
FIG. 9 is a top view showing a vehicle air-conditioning apparatus 1b according to Embodiment 3.
Figure 10:
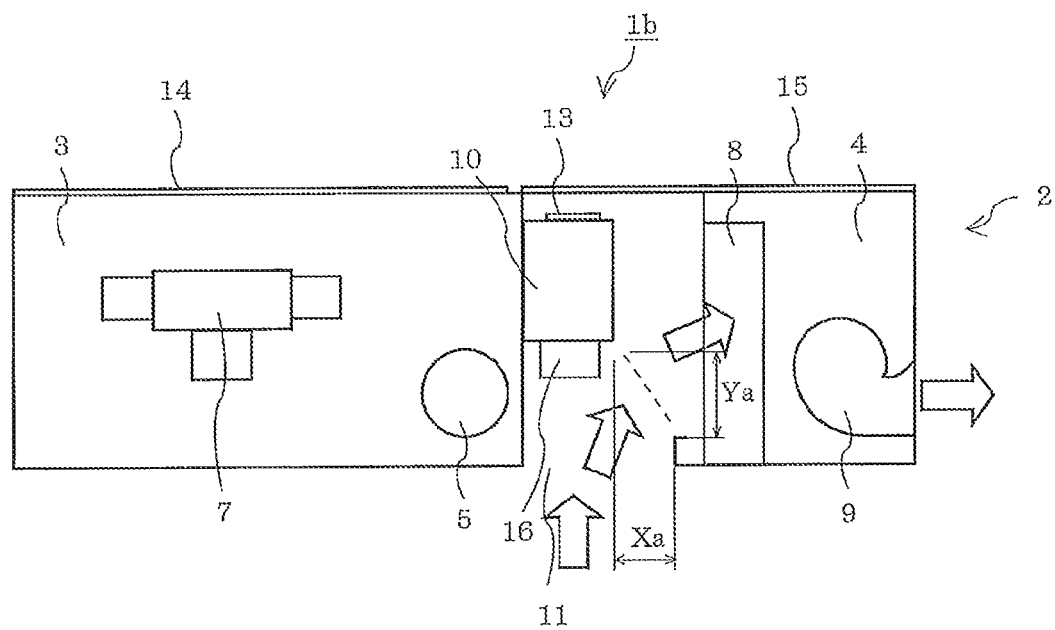
FIG. 10 is a side view showing the vehicle air-conditioning apparatus 1b according to Embodiment 3.

A vehicle air-conditioning apparatus 1b according to Embodiment 3 will be described. FIG. 9 is a top view showing the vehicle air-conditioning apparatus 1b according to Embodiment 3. FIG. 10 is a side view showing the vehicle air-conditioning apparatus 1b according to Embodiment 3. The present embodiment is different from Embodiments 1 and 2 in that a cooling fin 16 is provided on a lower surface of an electrical component box 10. A description of similarities of Embodiment 3 to Embodiments 1 and 2 will be omitted, and Embodiment 3 will be described with a focus on differences from Embodiments 1 and 2.

As shown in FIGS. 9 and 10, the cooling fin 16 is provided on the lower surface of the electrical component box 10. The cooling fin 16 cools the electrical component box 10. Since the cooling fin 16 is installed on the lower surface of the electrical component box 10 in the present embodiment, in-vehicle air from a return port 11 which passes close to the cooling fin 16 promotes heat dissipation by the cooling fin 16. This allows efficient cooling of an inverter and the like housed in the electrical component box 10 and extension of service lives of the parts. As described above, the present embodiment can achieve an effect of extending the service lives of the parts in the electrical component box 10, in addition to the effects achieved in Embodiments 1 and 2.

Embodiment 4

Figure 11:
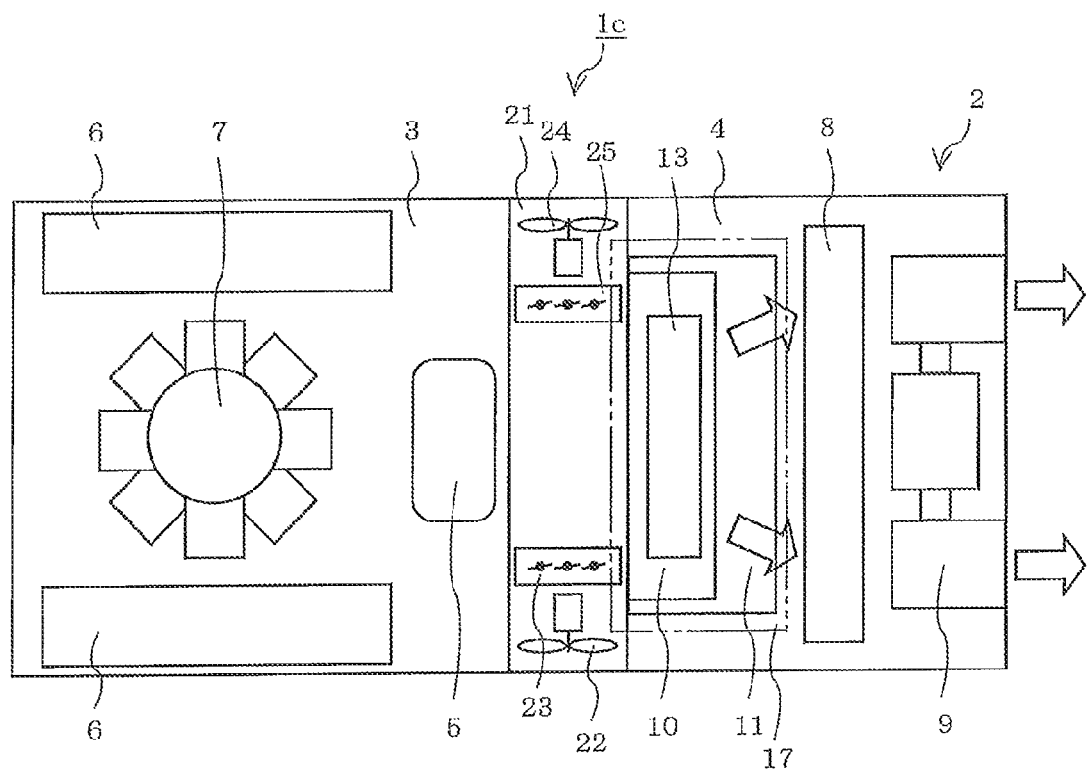
FIG. 11 is a top view showing a vehicle air-conditioning apparatus 1c according to Embodiment 4.
Figure 12:
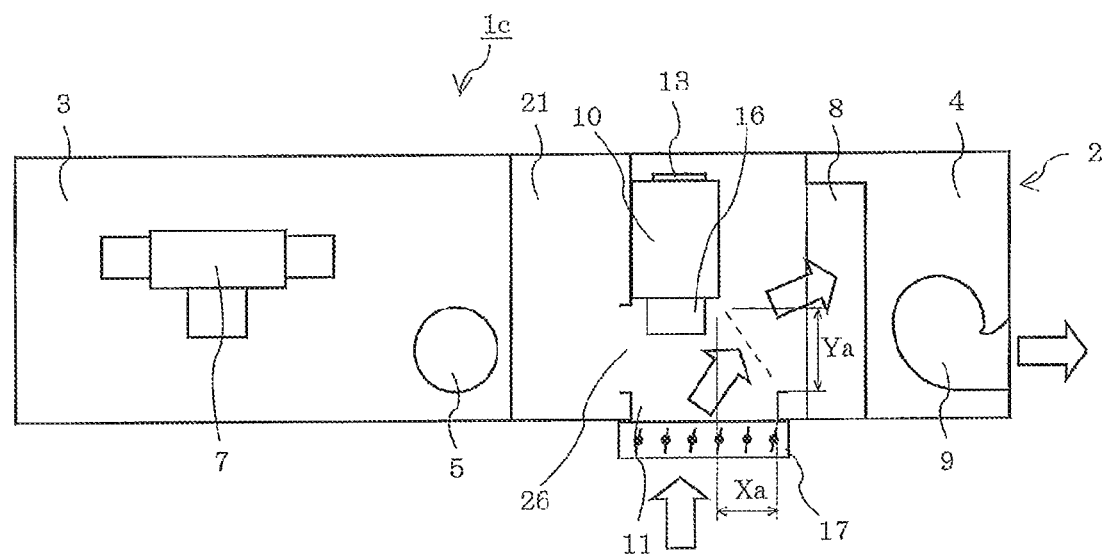
FIG. 12 is a side view showing the vehicle air-conditioning apparatus 1c according to Embodiment 4.

A vehicle air-conditioning apparatus 1c according to Embodiment 4 will be described. FIG. 11 is a top view showing the vehicle air-conditioning apparatus 1c according to Embodiment 4. FIG. 12 is a side view showing the vehicle air-conditioning apparatus 1c according to Embodiment 4. The vehicle air-conditioning apparatus 1c according to the present embodiment is different from Embodiments 1, 2, and 3 in that a return damper 17, an intake fan 22 and an intake damper 23, and an exhaust fan 24 and an exhaust damper 25 are provided. A description of similarities of Embodiment 4 to Embodiments 1, 2, and 3 will be omitted, and Embodiment 4 will be described with a focus on differences from Embodiments 1, 2, and 3.

As shown in FIGS. 11 and 12, the return damper 17 is provided on a return port 11. An amount of in-vehicle air to be taken in through the return port 11 is adjusted by opening and closing the return damper 17. An intake and exhaust chamber 21 is separately provided, for example, between an outdoor unit chamber 3 and an indoor unit chamber 4, and the intake fan 22 and the exhaust fan 24 are provided at two end portions, respectively, in a vehicle width direction of the intake and exhaust chamber 21. The intake fan 22 of the fans is designed to take in out-of-vehicle air from outside a vehicle. The taken-in out-of-vehicle air then flows into the indoor unit chamber 4. Note that an opening port 26 is provided at a position, which is lower than an electrical component box 10 installed so as to be close to the ceiling of the indoor unit chamber 4, of a partition between the intake and exhaust chamber 21 and the indoor unit chamber 4. Out-of-vehicle air taken in by the intake fan 22 passes through the opening port 26 and flows into the indoor unit chamber 4. In a passageway for the out-of-vehicle air, the intake damper 23 is provided downstream of the intake fan 22. An amount of out-of-vehicle air to be taken in by the intake fan 22 is adjusted by opening and closing of the intake damper 23.

The exhaust fan 24 is designed to exhaust in-vehicle air taken in through the return port 11 to outside the vehicle. In a passageway for the in-vehicle air, the exhaust damper 25 is provided upstream of the exhaust fan 24. An amount of in-vehicle air to be exhausted from the exhaust fan 24 is adjusted by opening and closing the exhaust damper 25. Note that in-vehicle air taken in through the return port 11 circulates between an interior of the vehicle and the indoor unit chamber 4 in a state where the intake fan 22 and the exhaust fan 24 are at a standstill, the intake damper 23 and the exhaust damper 25 are closed, and the return damper 17 is open. In this case, the electrical component box 10 is cooled only by in-vehicle air taken in through the return port 11, as in Embodiments 1, 2, and 3.

Figure 13:
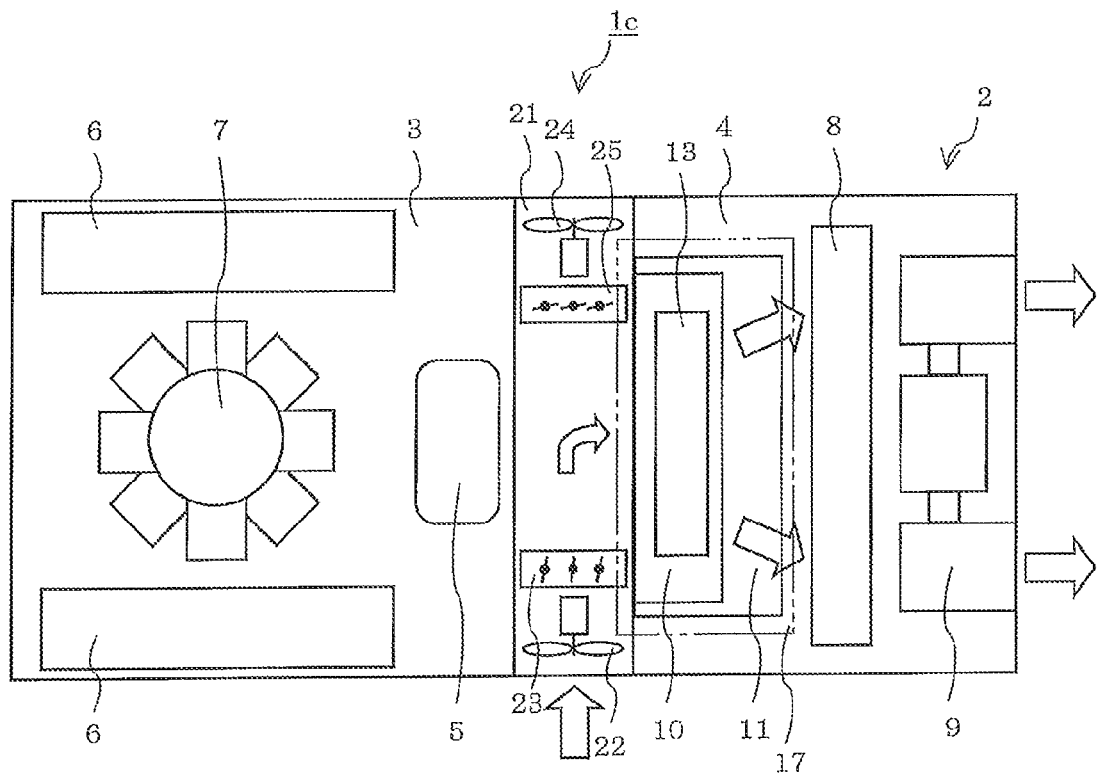
FIG. 13 is a top view showing action of the vehicle air-conditioning apparatus 1c according to Embodiment 4.
Figure 14:
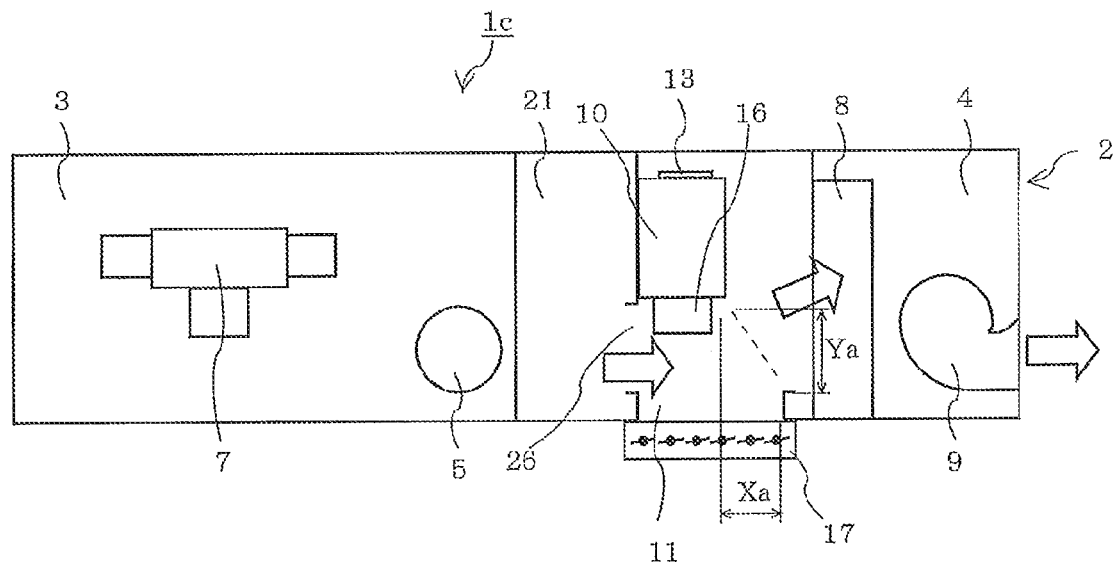
FIG. 14 is a side view showing the action of the vehicle air-conditioning apparatus 1c according to Embodiment 4.
Figure 15:
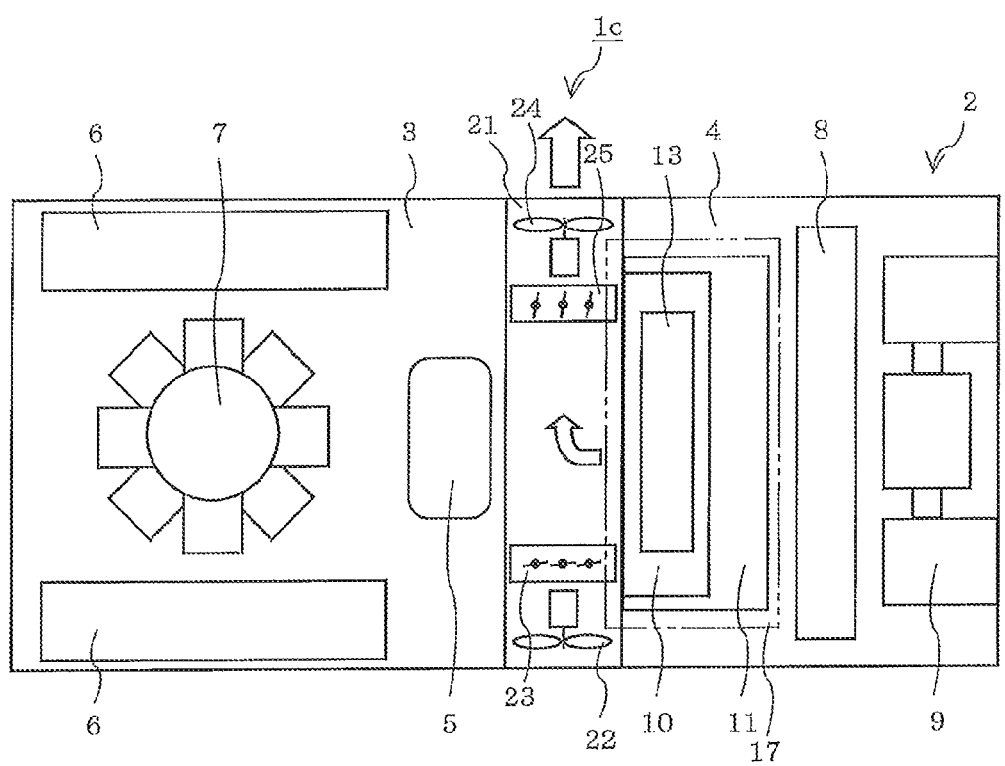
FIG. 15 is a top view showing the action of the vehicle air-conditioning apparatus 1c according to Embodiment 4.
Figure 16:
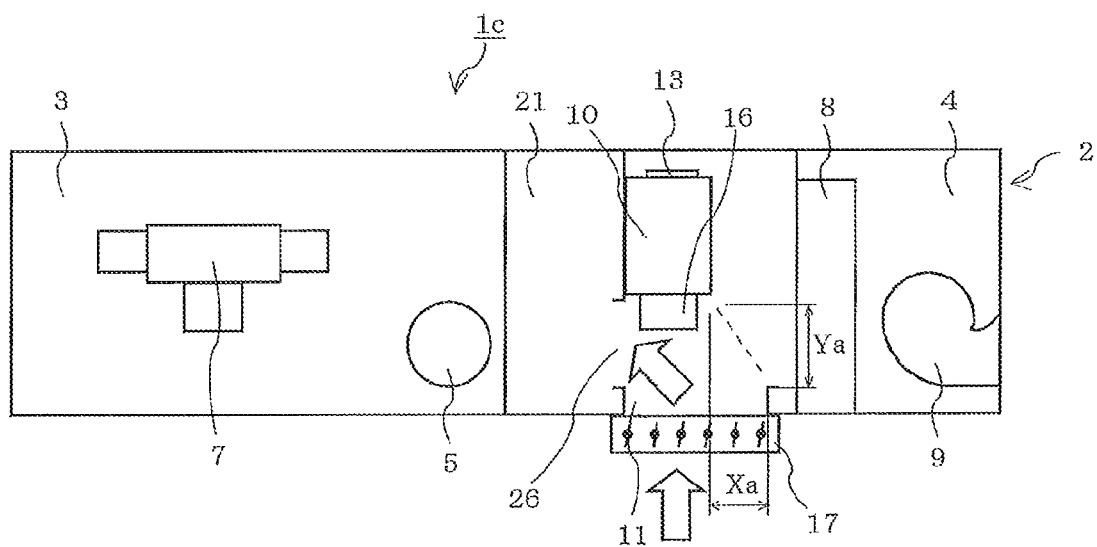
FIG. 16 is a side view showing the action of the vehicle air-conditioning apparatus 1c according to Embodiment 4.

Action of the vehicle air-conditioning apparatus 1c according to Embodiment 4 will be described. FIG. 13 is a top view showing the action of the vehicle air-conditioning apparatus 1c according to Embodiment 4. FIG. 14 is a side view showing the action of the vehicle air-conditioning apparatus 1c according to Embodiment 4. FIG. 15 is a top view showing the action of the vehicle air-conditioning apparatus 1c according to Embodiment 4. FIG. 16 is a side view showing the action of the vehicle air-conditioning apparatus 1c according to Embodiment 4.

A case where out-of-vehicle air is taken in will be described first with reference to FIGS. 13 and 14. As shown in FIGS. 13 and 14, the intake fan 22 is first brought into operation, and the intake damper 23 is opened. The exhaust fan 24 is then brought into a standstill, and the exhaust damper 25 is closed. The return damper 17 is also closed to stop intake of in-vehicle air through the return port 11. In this state, fresh out-of-vehicle air taken in by the intake fan 22 flows into the indoor unit chamber 4, passes below the electrical component box 10, and is blown into the vehicle by the indoor blower 9. Since the electrical component box 10 is installed so as to be close to the ceiling of the indoor unit chamber 4, the out-of-vehicle air taken in by the intake fan 22 can pass below the electrical component box 10. The out-of-vehicle air during the passage comes into contact with the electrical component box 10 and can cool the electrical component box 10. As described above, in intake mode in which the intake fan 22 is operated, the electrical component box 10 can be cooled even if in-vehicle air does not flow in through the return port 11. It is thus possible to operate the vehicle air-conditioning apparatus 1c while inhibiting parts housed in the electrical component box 10 from overheating.

A case where in-vehicle air is exhausted will be described with reference to FIGS. 15 and 16. As shown in FIGS. 15 and 16, the intake fan 22 is brought into a standstill, and the intake damper 23 is closed. The exhaust fan 24 is brought into operation, and the exhaust damper 25 is opened. When the return damper 17 is opened in this state, in-vehicle air is taken into the indoor unit chamber 4 through the return port 11. The taken-in in-vehicle air passes below the electrical component box 10 and is exhausted to outside the vehicle by the exhaust fan 24. Since the electrical component box 10 is installed so as to be close to the ceiling of the indoor unit chamber 4, the in-vehicle air taken in through the return port 11 can pass below the electrical component box 10 and then arrive at the exhaust fan 24. The in-vehicle air during the passage comes into contact with the electrical component box 10 and can cool the electrical component box 10. As described above, in exhaust mode in which the exhaust fan 24 is operated, the electrical component box 10 can be cooled even when the intake fan 22 is at a standstill. It is thus possible to operate the vehicle air-conditioning apparatus 1c while inhibiting the parts housed in the electrical component box 10 from overheating.

As described above, the present embodiment can achieve an effect of cooling the electrical component box 10 by operating the intake fan 22 or the exhaust fan 24, for example, even if any fan, any blower, or the like stops in an emergency, in addition to the effects achieved in Embodiments 1, 2, and 3.

Embodiment 5

Figure 17:
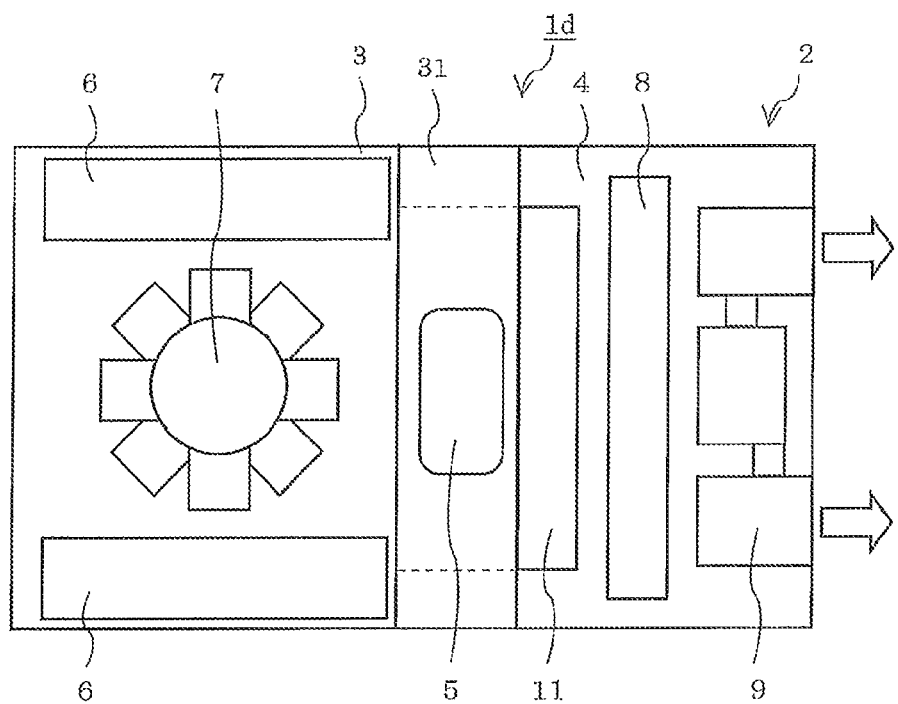
FIG. 17 is a top view showing a vehicle air-conditioning apparatus 1d according to Embodiment 5.
Figure 18:
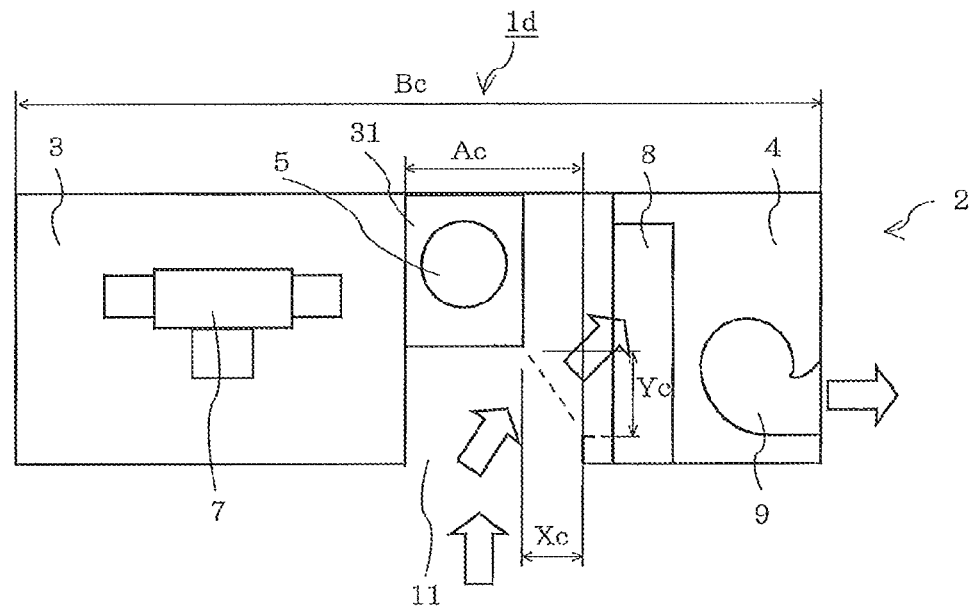
FIG. 18 is a side view showing the vehicle air-conditioning apparatus 1d according to Embodiment 5.

A vehicle air-conditioning apparatus 1d according to Embodiment 5 will be described. FIG. 17 is a top view showing the vehicle air-conditioning apparatus 1d according to Embodiment 5. FIG. 18 is a side view showing the vehicle air-conditioning apparatus 1d according to Embodiment 5. The vehicle air-conditioning apparatus 1d according to the present embodiment is different from Embodiment 1 in that the vehicle air-conditioning apparatus 1d adopts an ON/OFF control system without no built-in inverter, that the vehicle air-conditioning apparatus 1d has no electrical component box 10, and that a compressor 5 is installed in a compressor chamber 31. A description of similarities of Embodiment 5 to Embodiment 1 will be omitted, and Embodiment 5 will be described with a focus on differences from Embodiment 1.

As shown in FIGS. 17 and 18, in the present embodiment, the compressor chamber 31 is separately provided, in addition to an outdoor unit chamber 3 and an indoor unit chamber 4. An apparatus main body 2 includes the compressor chamber 31, the outdoor unit chamber 3, and the indoor unit chamber 4. The compressor 5 is installed in the compressor chamber 31. The compressor chamber 31 is installed in a space inside the apparatus main body 2 so as to be close to the ceiling of the apparatus main body 2, the space defined above a return port 11. As described above, in the present embodiment, the compressor chamber 31 is installed at a position away from the return port 11. The compressor chamber 31 is cooled when in-vehicle air taken in through the return port 11 comes into contact with the compressor chamber 31.

Figure 19:
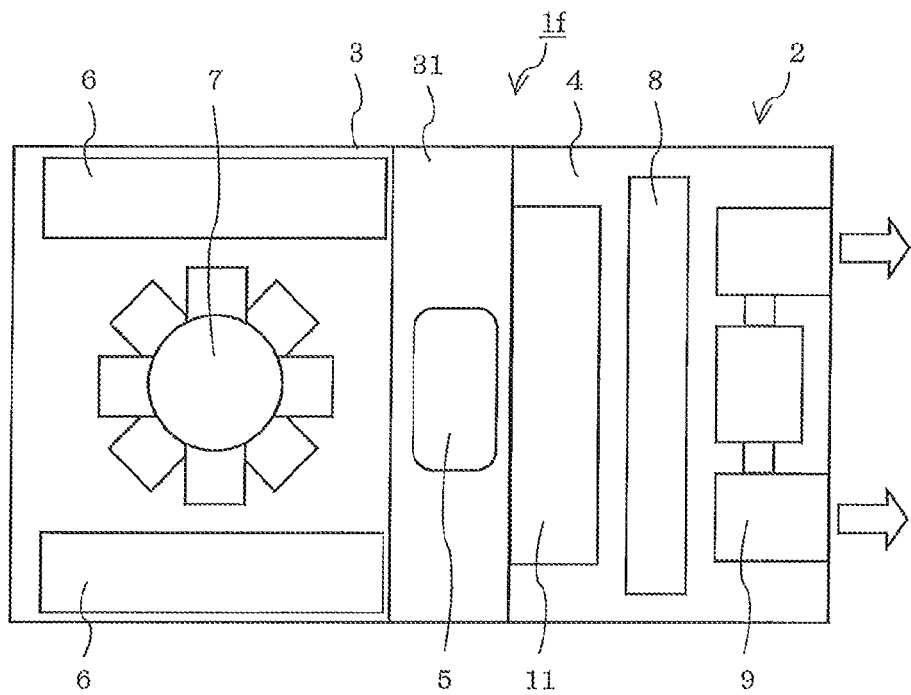
FIG. 19 is a top view showing a vehicle air-conditioning apparatus 1f with a compressor chamber 31 arranged in proximity to a return port 11.
Figure 20:
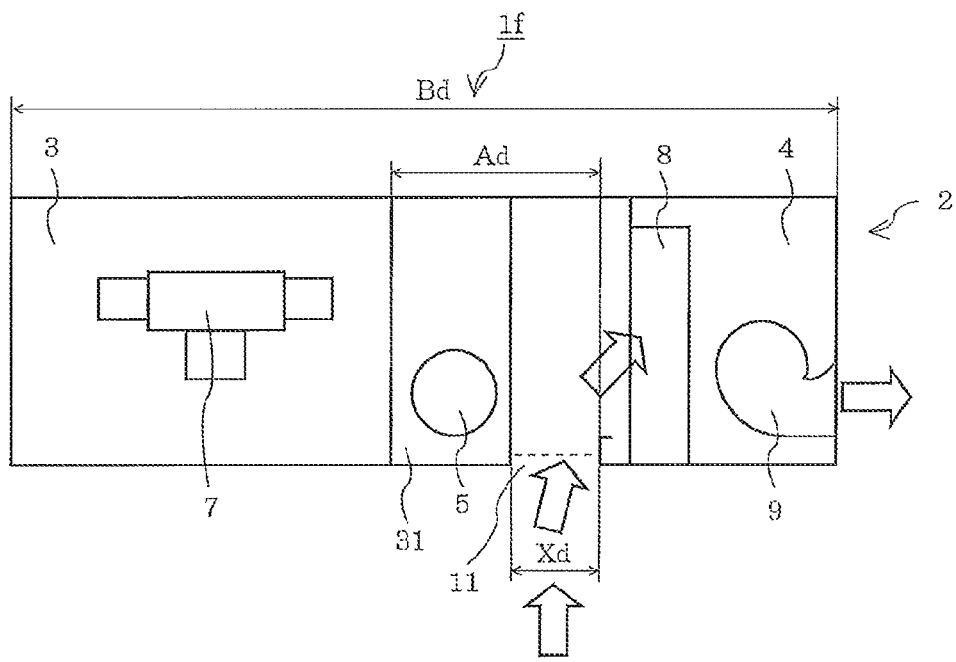
FIG. 20 is a side view showing the vehicle air-conditioning apparatus 1f with the compressor chamber 31 arranged in proximity to the return port 11.

Action of the vehicle air-conditioning apparatus 1*d* according to Embodiment 5 will be described. FIG. 19 is a top view showing a vehicle air-conditioning apparatus 1*f* with the compressor chamber 31 arranged in proximity to the return port 11. FIG. 20 is a side view of the vehicle air-conditioning apparatus 1*f* with the compressor chamber 31 arranged in proximity to the return port 11. To clearly explain the action of the vehicle air-conditioning apparatus 1*d* according to the present embodiment, the vehicle air-conditioning apparatus 1*d* (FIGS. 17 and 18) according to the present embodiment will be compared with the vehicle air-conditioning apparatus 1*f* (FIGS. 19 and 20) with the compressor chamber 31 arranged in proximity to the return port 11.

Referring to FIGS. 19 and 20, the compressor chamber 31 is installed on a vehicle side of the apparatus main body 2 in a space inside the apparatus main body 2, the space defined above the return port 11. For this reason, a part of the return port 11 is blocked by the compressor chamber 31. In-vehicle air thus passes through a portion of the return port 11 which is not blocked by the compressor chamber 31 and flows into the indoor unit chamber 4. A passageway for in-vehicle air is narrowest at the portion of the return port 11 that is not blocked by the compressor chamber 31. Let Xd be a dimension in a vehicle longitudinal direction at the portion. Note that let Ad be a dimension in the vehicle longitudinal direction at the return port 11 and Bd be a dimension in the vehicle longitudinal direction of the apparatus main body 2.

In the present embodiment, the return port 11 is not blocked by the compressor chamber 31, and a passageway for in-vehicle air taken in through the return port 11 is narrowest at a gap between an edge in the vehicle longitudinal direction of the return port 11 and the compressor chamber 31, as shown in FIGS. 17 and 18. A diagonal dimension of the gap between the edge in a vehicle longitudinal direction of the return port 11 and the compressor chamber 31 corresponds to Xd in FIG. 20. Let Xc be a dimension in the vehicle longitudinal direction of the gap and Yc be a dimension in a vehicle vertical direction of the gap. Note that let Ac be a dimension in the vehicle longitudinal direction at the return port 11 and Bc be a dimension in the vehicle longitudinal direction of the apparatus main body 2.

In the vehicle air-conditioning apparatus 1*f* in FIGS. 19 and 20, the compressor chamber 31 is arranged in proximity to the return port 11, and a ventilation static pressure of in-vehicle air taken in through the return port 11 is high. For this reason, Xd needs to be increased in order to reduce a ventilation static pressure loss of in-vehicle air. To increase Xd, an area (Ad) of the return port 11 needs to be increased. This increases Bd, which results in an increase in entire length of the vehicle air-conditioning apparatus 1*f* in FIGS. 19 and 20 and an increase in mass.

In contrast, in the vehicle air-conditioning apparatus 1*d* according to the present embodiment, the compressor chamber 31 is installed in a space inside the apparatus main body 2 so as to be close to the ceiling of the apparatus main body 2, the space defined above the return port 11, and the gap between the edge in the vehicle longitudinal direction of the return port 11 and the compressor chamber 31 is inclined in a side view. That is, while Xd is a horizontal dimension in FIG. 20, the portion corresponding to Xd (the gap between the edge in the vehicle longitudinal direction of the return port 11 and the compressor chamber 31) is inclined in the present embodiment. A component (the dimension Xc) in the vehicle longitudinal direction for the portion is thus smaller than Xd. As described above, since Xc<Xd holds, the dimension Ac in the vehicle longitudinal direction at the return port 11 can be made smaller (Ac<Ad). The dimension Bc in the vehicle longitudinal direction of the apparatus main body 2 can also be made smaller (Bc<Bd). As seen from the above, the vehicle air-conditioning apparatus 1*d* according to the present embodiment can be reduced in size and mass while securing a sufficient amount of in-vehicle air ventilation from the return port 11.

REFERENCE SIGNS LIST

1, 1*a*, 1*b*, 1*c*, 1*d*, 1*e*, 1*f* vehicle air-conditioning apparatus
2 apparatus main body
3 outdoor unit chamber
4 indoor unit chamber
5 compressor
6 condenser (first heat exchanger)
7 outdoor blower
8 evaporator (second heat exchanger)
9 indoor blower
10 electrical component box
11 return port
13 access cover
14 outdoor top cover
15 indoor top cover
16 cooling fin
17 return damper
21 intake and exhaust chamber
22 intake fan
23 intake damper
24 exhaust fan
25 exhaust damper
26 opening port
31 compressor chamber
41 vehicle
42 ceiling
43 ceiling (under air-conditioning apparatus)

The invention claimed is:

1. A vehicle air-conditioning apparatus comprising:
an apparatus main body installed at an upper portion of a vehicle, the apparatus main body including an outdoor unit chamber and an indoor unit chamber that is adjacent to the outdoor unit chamber with a partition therebetween;
a compressor installed in the outdoor unit chamber;
a first heat exchanger installed in the outdoor unit chamber to exchange heat between refrigerant and out-of-vehicle air;
an outdoor blower installed in the outdoor unit chamber to blow the out-of-vehicle air after heat exchange in the first heat exchanger to outside the vehicle;
a second heat exchanger installed in the indoor unit chamber to exchange heat between the refrigerant and in-vehicle air;
an indoor blower installed in the indoor unit chamber to blow the in-vehicle air after heat exchange in the second heat exchanger into the vehicle;
an electrical component box installed in the indoor unit chamber and housing an inverter that controls the compressor; and a return port to take in the in-vehicle air, provided at a lower portion of the indoor unit chamber, wherein the electrical component box is provided above the return port in a vertical direction, and is positioned in a space inside the indoor unit chamber so as to be close to a ceiling of the indoor unit chamber, the space defined above the return port, and a lower portion of the electrical component box is installed at a position away from the return port in the vertical direction and a horizontal direction.

2. The vehicle air-conditioning apparatus of claim 1, wherein an openable and closable access cover is provided on an upper surface of the electrical component box.

3. The vehicle air-conditioning apparatus of claim 1, wherein a cooling fin is attached to the electrical component box.

4. The vehicle air-conditioning apparatus of claim 1, wherein a return damper to adjust an amount of the in-vehicle air to be taken in through the return port is provided to the return port.

5. The vehicle air-conditioning apparatus of claim 1, further comprising:

an intake fan to take the out-of-vehicle air into the indoor unit chamber; and an intake damper to adjust an amount of the out-of-vehicle air to be taken in by the intake fan, wherein the electrical component box is arranged midway along a passageway for the out-of-vehicle air.

6. The vehicle air-conditioning apparatus of claim 1, further comprising:

an exhaust fan to exhaust the in-vehicle air taken in through the return port to outside the vehicle; and an exhaust damper to adjust an amount of the in-vehicle air to be exhausted by the exhaust fan, wherein the electrical component box is arranged midway along a passageway for the in-vehicle air.

7. A vehicle air-conditioning apparatus comprising:

an apparatus main body installed at an upper portion of a vehicle, the apparatus main body including an outdoor unit chamber, an indoor unit chamber, and a compressor chamber that is adjacent to the indoor unit chamber with a partition therebetween;

a compressor installed in the compressor chamber;

a first heat exchanger installed in the outdoor unit chamber to exchange heat between refrigerant compressed in the compressor and out-of-vehicle air;

an outdoor blower installed in the outdoor unit chamber to blow the out-of-vehicle air after heat exchange in the first heat exchanger to outside the vehicle;

a second heat exchanger installed in the indoor unit chamber to exchange heat between the refrigerant after passage through the first heat exchanger with in-vehicle air;

an indoor blower installed in the indoor unit chamber to blow the in-vehicle air after heat exchange in the second heat exchanger into the vehicle; and a return port to take in the in-vehicle air, provided at a lower portion of the indoor unit chamber, wherein the compressor chamber is provided above the return port in a vertical direction, and is positioned in a space inside the apparatus main body so as to be close to a ceiling of the apparatus main body, the space defined above the return port, and a lower portion of the compressor chamber is installed at a position away from the return port in the vertical direction and a horizontal direction.

8. The vehicle air-conditioning apparatus of claim 1, wherein the return port occupies an area larger than an area occupied by the electrical component box in a plan view of the apparatus main body.

9. A vehicle air-conditioning apparatus comprising:

an apparatus main body installed at an upper portion of a vehicle, the apparatus main body including an outdoor unit chamber and an indoor unit chamber that is adjacent to the outdoor unit chamber with a partition at an end portion on a side;

a compressor installed at an end portion on an indoor unit chamber side of the outdoor unit chamber;

a first heat exchanger installed in the outdoor unit chamber to exchange heat between refrigerant and out-of-vehicle air;

an outdoor blower installed in the outdoor unit chamber to blow the out-of-vehicle air after heat exchange in the first heat exchanger to outside the vehicle;

a second heat exchanger installed at a midpoint in a vehicle longitudinal direction of the indoor unit chamber to exchange heat between the refrigerant and in-vehicle air;

an indoor blower, installed at an end portion of the indoor unit chamber on a side opposite to the outdoor unit chamber, to blow the in-vehicle air after heat exchange in the second heat exchanger into the vehicle;

an electrical component box installed in the indoor unit chamber and housing an inverter that controls the compressor; and a return port to take in the in-vehicle air, provided between the partition and the second heat exchanger at a lower portion of the indoor unit chamber, wherein the electrical component box is provided above the return port in a vertical direction, and is positioned in a space inside the indoor unit chamber so as to be close to a ceiling of the indoor unit chamber, the space defined above the return port, and a lower portion of the electrical component box is installed at a position away from the return port in the vertical direction and a horizontal direction.

* * * * *